J. W. BRUNDAGE.
NUT LOCKING DEVICE.
APPLICATION FILED MAR. 29, 1913.
1,079,834.
Patented Nov. 25, 1913.
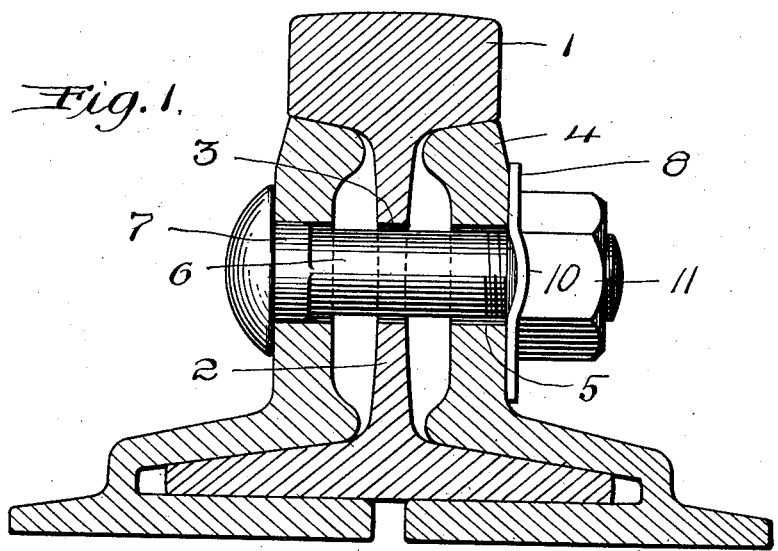
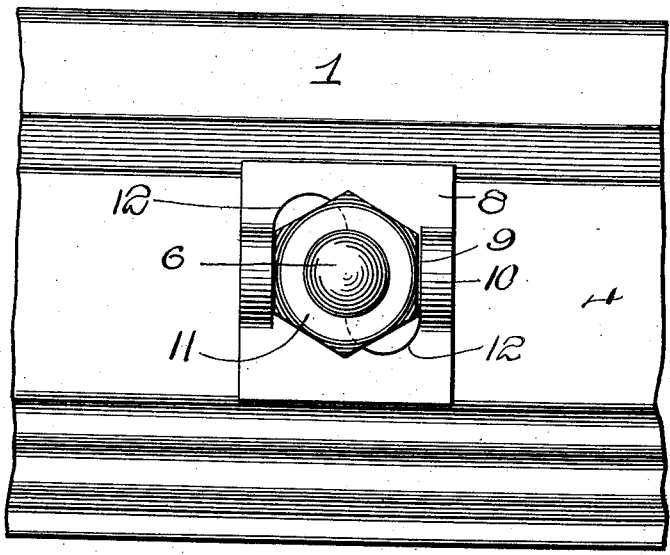
WITNESSES
INVENTOR
J. W. BRUNDAGE,
ATTORNEY.

UNITED STATES PATENT OFFICE.

JAMES WILLIAM BRUNDAGE, OF WEST NEWTON, PENNSYLVANIA.

NUT-LOCKING DEVICE.

1,079,834. Specification of Letters Patent. Patented Nov. 25, 1913.

Application filed March 29, 1913. Serial No. 757,549.

*To all whom it may concern:*

Be it known that I, JAMES WILLIAM BRUNDAGE, a citizen of the United States of America, residing at West Newton, in the county of Westmoreland and State of Pennsylvania, have invented certain new and useful Improvements in Nut-Locking Devices, of which the following is a specification, reference being had therein to the accompanying drawing.

This invention relates to a nut locking device, and the primary object of my invention is the provision of positive and reliable means, in a manner as hereinafter set forth, for locking a nut upon the end of a bolt, tie rod or other structure, whereby the nut cannot become accidentally displaced.

Another object of this invention is to provide a nut locking device that can be advantageously used in connection with rail joints, rolling stock, bridges, and such structures that are subjected to vibrations which have a tendency to displace nuts relatively to bolts.

A further object of this invention is to provide a simple, durable and inexpensive nut locking washer that is shaped to engage a nut and retain the same upon the threaded end of a bolt, also to compensate for expansion and contraction.

I attain the above objects by a mechanical construction that will be hereinafter specifically described and then claimed, and reference will now be had to the drawing, wherein:—

Figure 1 is a side elevation of a nut locking device in accordance with this invention, and Fig. 2 is a front elevation of the same.

In the drawing, the reference numeral 1 denotes, by the way of an example, a rail that has a web 2 thereof provided with an opening 3. Bracing the sides of the rail 1 are splice bars 4 and these bars are provided with openings 5 alining with the opening 3 of the rail web 2 to receive a bolt 6, which has the headed end thereof provided with an oval enlargement 7 extending into one of the splice bars to prevent the bolt from rotating relatively to said bars.

My improved nut locking device has been illustrated in connection with the bolt 6, and said device comprises a rectangular washer 8 made of spring steel and provided with a central opening to receive the bolt 6. The lower edge of the washer prevents said washer from rotating relatively to the bolt 6 and the side edges of said washer are slitted, as at 9 and bent to provide diametrically opposed offset portions 10 adapted to engage the facets of a nut 11 screwed upon said bolt and against said washer. The offset portions 10 are vertically disposed and the slits 9 are provided with semi-circular extensions 12 in communication with the opening of the washer through which said bolt passes. The semi-circular slits are diametrically opposed in order not to weaken the construction of said washer, and these slits are adapted to compensate for expansion and contraction of the washer, besides allowing the offset portions 10 of the washer to recede as the nut 11 is tightened against said washer.

When the locking device is used in connection with wood, as wooden box cars, it can be easily provided with fins or prongs to engage in the wood and hold the washer stationary relatively thereto.

It is thought that the utility of a locking washer in accordance with this invention will be apparent without further description, and while in the drawing there is illustrated a preferred embodiment of the invention it is to be understood that the structural elements are susceptible to such variations and modifications as fall within the scope of the appended claim.

What I claim is:—

In a nut locking device, the combination with a bolt, and a nut screwed upon said bolt, of a rectangular washer arranged upon said bolt and having a central opening for said bolt, said washer having diametrically opposed sides thereof slitted and depressed to provide diametrically opposed offset portions adapted to engage opposite facets of said nut, said washer having the slitted portions thereof prolonged to form semi-circular slits in communication with the opening that receives said bolt whereby the slits of said washer will compensate for the expansion and contraction thereof.

In testimony whereof I affix my signature in the presence of two witnesses.

JAMES WILLIAM BRUNDAGE.

Witnesses:
W. F. MCKENERY,
F. M. GAAL.

---

Copies of this patent may be obtained for five cents each, by addressing the "Commissioner of Patents, Washington, D. C."